(12) United States Patent
Zimmer et al.

(10) Patent No.: US 6,651,707 B2
(45) Date of Patent: Nov. 25, 2003

(54) MOTOR-VEHICLE FUEL-TANK FILLER ASSEMBLY

(75) Inventors: Werner Zimmer, Melsungen (DE); Kurt Apel, Neuenstein (DE)

(73) Assignee: TI Group Automotive Systems (Fuldabruck) GmbH, Fuldabruc (DE)

( * ) Notice: Subject to any disclaimer, the term of this patent is extended or adjusted under 35 U.S.C. 154(b) by 0 days.

(21) Appl. No.: 10/142,660

(22) Filed: May 10, 2002

(65) Prior Publication Data
US 2002/0185187 A1 Dec. 12, 2002

(30) Foreign Application Priority Data
Jun. 9, 2001 (EP) .............................. 01114097

(51) Int. Cl.[7] ................................ B65B 1/04
(52) U.S. Cl. ................ 141/286; 220/86.2; 220/DIG. 33
(58) Field of Search .................... 141/285, 286, 141/287; 220/86.2, 288, DIG. 33

(56) References Cited
U.S. PATENT DOCUMENTS
2,597,014 A  5/1952  Mariani 6,220,064 B1  4/2001  Oddenino
6,321,801 B1 * 11/2001  Hagano et al. ............. 141/301

FOREIGN PATENT DOCUMENTS
FR  2 627 748  9/1989

* cited by examiner

*Primary Examiner*—Gene Mancene
*Assistant Examiner*—Peter deVore
(74) *Attorney, Agent, or Firm*—Herbert Dubno; Andrew Wilford

(57) ABSTRACT

A filler-tube assembly for a fuel tank has a filler tube having an upper end formed by a tubular inner wall defining a fill passage and having an outer surface and a concentric outer wall fixed relative to and defining with the inner wall an annular and upwardly open space and having an inner surface and an end surface. A cap adapted to fit over the outer end has a tubular extension fittable in the space and having inner and outer surfaces and an end surface bridging the respective inner and outer surfaces. A seal ring in the space is engaged between one of the surfaces of the cap and one of the surfaces of the filler tube.

11 Claims, 2 Drawing Sheets

MOTOR-VEHICLE FUEL-TANK FILLER ASSEMBLY

FIELD OF THE INVENTION

The present invention relates to a gas or fuel-tank cap. More particularly this invention concerns a fuel-tank filler assembly for a motor vehicle.

BACKGROUND OF THE INVENTION

A fuel tank, for instance on a motor vehicle, has a filler tube whose outer end is normally closed by a cap that is removed for insertion of a filling nozzle when the tank is to be refilled. In order to suppress release of vapors from the tank, which is typically connected via a vent line to the intake manifold of the vehicle engine, the cap must make a very tight seal.

Thus it is standard for the cap to have a tubular center part that fits down into the filler tube and that has an outer surface confronting an inner surface of the tube. One of these surfaces, normally the outer surface of the cap's center part or an inner face of the cap, is provided with a compressible seal that presses radially or axially against the other surface when the cap is secured in place, which is normally assisted by some sort of bayonet or screwthread system. See for example U.S. Pat. No. 2,597,014 of Mariani, U.S. Pat. No. 6,220,064 of Oddenino, or French patent 2,627,748 of Percebois.

The disadvantage of these arrangements is that insertion of the normally metallic filler nozzle into the filler tube entails some scraping of the nozzle on the inner filler-tube surface or at least one of the seal surfaces is left exposed when the cap is removed. The result is some scratching and scoring of this filler-tube surface. In time the damage is such that a good seal can no longer be made against the filler-tube surface. In fact in old cars as much as 80% of the vapors that escape from the vehicle do so via the faulty filler-tube seal.

OBJECTS OF THE INVENTION

It is therefore an object of the present invention to provide an improved filler-tube assembly for a fuel tank.

Another object is the provision of such an improved filler-tube assembly for a fuel tank which overcomes the above-given disadvantages, that is which ensures that a good seal will be maintained over a long service life.

SUMMARY OF THE INVENTION

A filler-tube assembly for a fuel tank has according to the invention a filler tube having an upper end formed by a tubular inner wall defining a fill passage and having an outer surface and a concentric outer wall fixed relative to and defining with the inner wall an annular and upwardly open space and having an inner surface and an end surface. A cap adapted to fit over the outer end has a tubular extension fittable in the space and having inner and outer surfaces and an end surface bridging the respective inner and outer surfaces. A seal ring in the space is engaged between one of the surfaces of the cap and one of the surfaces of the filler tube.

Thus with this arrangement the inner tube shields the seal surfaces so that a nozzle inserted into the passage cannot scratch and mar them. The seal ring will be able to form a perfect seal in the long run, completely preventing vapors from leaking out of the tank past the cap.

According to the invention the inner and outer walls have generally coplanar upper edges. Thus the seal surfaces are effectively recessed out of the way, well below the plane of these upper edges.

Furthermore the cap has an annular outer lip engaging downward around the outer wall. This outer lip and the outer wall are formed with complementary screwthread formations.

The seal ring in accordance with the invention can be set in the tubular cap extension and radially outwardly engage the inner surface of the outer wall. Alternately the seal is engaged between the end surfaces of the cap and filler tube.

The outer wall according to the invention is formed between the respective inner and end surfaces with an upwardly directed bevel. Similarly, the inner wall is formed at an outer edge of the respective inner surface with an upwardly directed bevel.

The fill tube can be formed with a second outer wall spaced radially outward from the first-mentioned outer wall and forming therewith an upwardly open annular space. The cap is formed with an outer lip fittable downward into the space between the second outer wall and the first outer wall. In addition the fill tube is formed at a base of the space between the second and first outer walls with a drain hole. In the same manner the fill tube is formed at a base of the space between the inner and outer walls with a drain hole opening into the passage. Thus any fuel that gets into the inner space when the cap is removed will be diverted down to the tank while any other liquid flowing over the cap into the outer space will be diverted outward.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
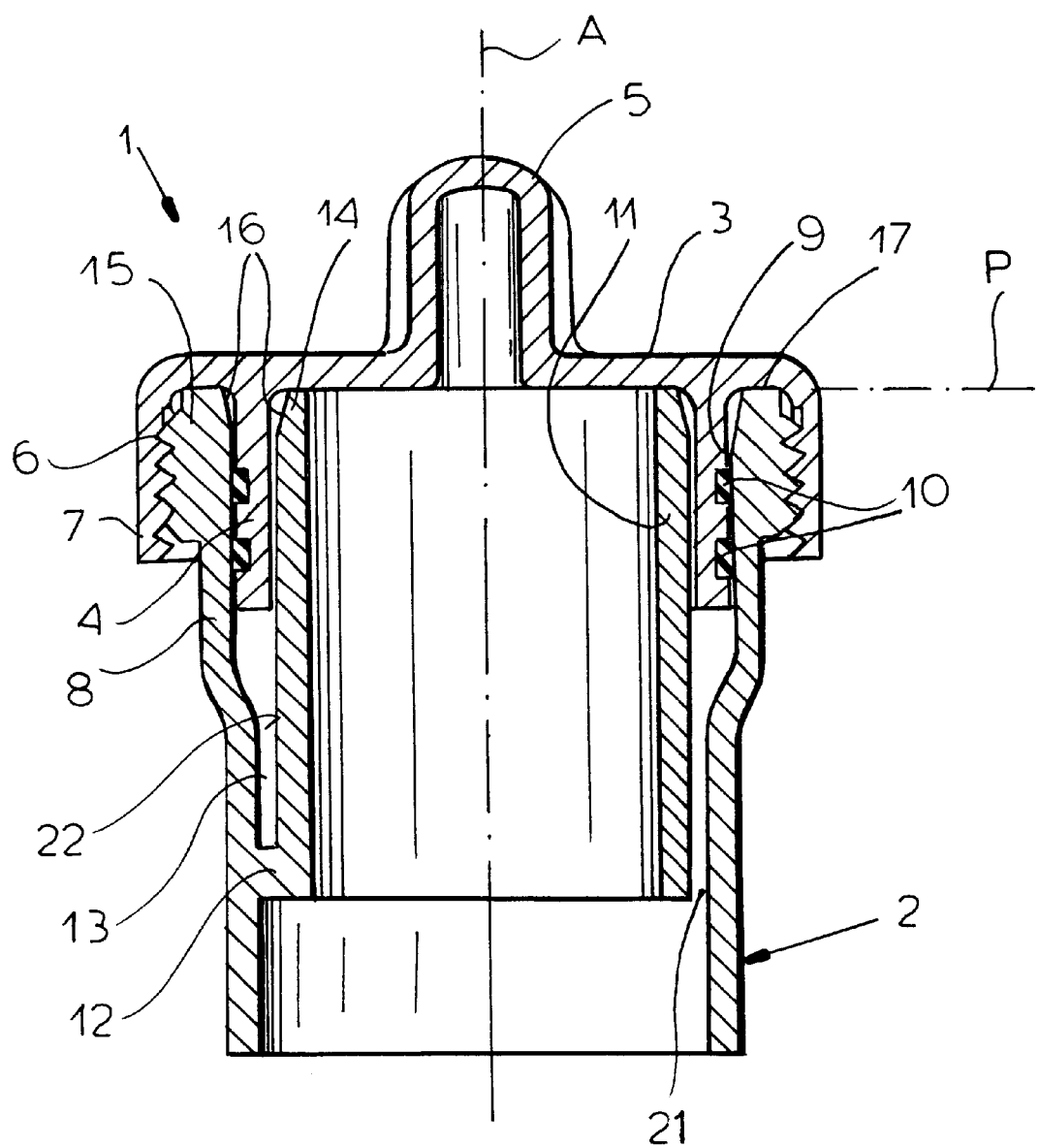
FIG. 1 is an axial section through a fuel-tank filler assembly according to the invention.

As seen in FIG. 1 a filler assembly basically comprises a cap 1 and a filler tube 2 both centered on a generally upright axis A. The tube 1 has an outer end formed by a cylindrically tubular inner wall 11 and a flared or outwardly stepped outer wall 15 coaxial to the inner wall 11 and connected thereto at a lower end of the inner wall 11 by a web 12. The two walls 11 and 15 respective have an outer surface 22 and an inner surface 9 that define a space 13 that can drain into the passage created by the tube 2 at a vent hole 21 extending through the web 12. The wall 11 has an outer end 14 defining a plane P on which an outer end edge 17 of the outer wall 15 lies.

The cap 1 has a basically flat disk-shaped body 3 from which a grip ridge 5 extends upward, extending diametrally across the body 3, and a pair of concentric tubular lips or extensions 4 and 7 that project downward. The inner tubular extension 4 has an outer surface 8 fitting with slight play inside the wall 15 and confronting the inner surface 9 thereof. O-rings 10 are set in the surface 8 and bear radially outward against the surface 9 to form a tight seal. The outer lip or wall 7 extends down over the outer wall 15 and complementary screwthreads 6 on the outer surface of the outer wall 15 and inner surface of the outer lip 7 allow the cap 1 to be screwed down on the filler tube 1. The surfaces 8 and 9 are formed at their outer edges with bevels 16 that ease insertion of the inner tubular extension 4 into the space 13.

With this system therefore the sealing surface 9 against which the rings 10 bear is protected by the inner wall 11 so that a filler nozzle never contacts this surface 9. Any fuel spilled into the space 13 will drain inward into the tube 2.

Figure 2:
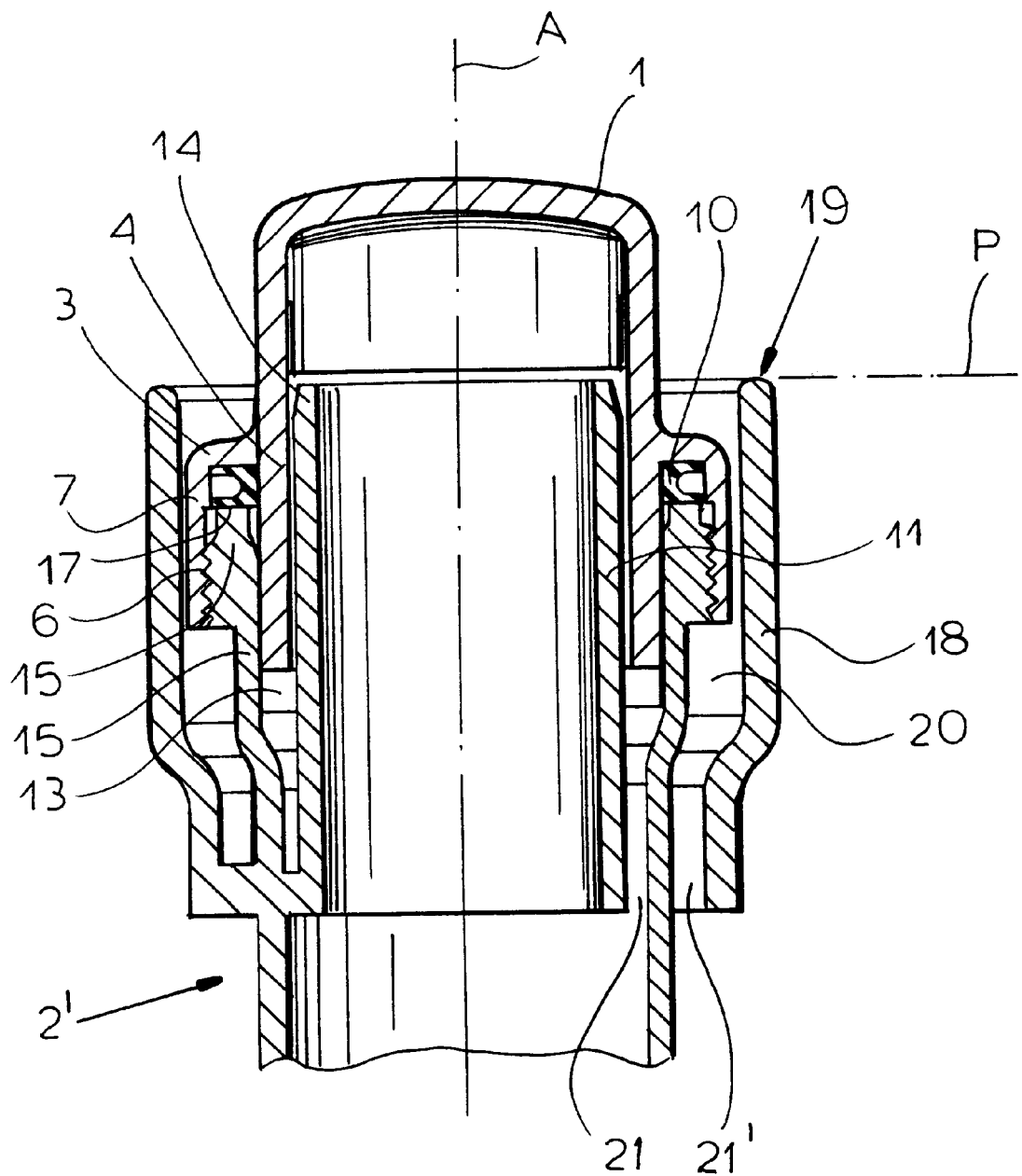
FIG. 2 is a view like FIG. 1 of another assembly in accordance with the invention.

In FIG. 2, where reference numerals identical to those of FIG. 1 are used for structurally identical elements, the tube 2' is formed with a second outer wall 18 defining with the first outer wall 15 a space 20 that is vented at 21' to the outside. Here the wall 18 has an upper end 19 that extends to the plane P of the end edge 14 but the wall 15 is substantially shorter so the surface 17 is well short of this plane P. The outer lip 7 of the cap 7 engages down in the space 20 and an outwardly open U-section seal ring 10 is compressed between the body 3 of the cap 1 and the end surface 17 of the wall 15. Thus this seal ring 10 is compressed axially. Once again, a nozzle inserted into the inner wall 11 will not contact the recessed seal surface 17, ensuring it remains unmarred and forms a good seal with the ring 10.

We claim:

1. A filler-tube assembly for a fuel tank, the filler tube assembly comprising:
    a filler tube having an upper end formed by
        a tubular inner wall defining a fill passage and having an outer surface and
        a concentric outer wall fixed relative to and defining with the inner wall an annular and upwardly open space and having an inner surface and an end surface;
    a cap adapted to fit over the outer end and having a tubular extension fittable in the space and having inner and outer surfaces and an end surface bridging the respective inner and outer surfaces; and
    a seal ring in the space engaged between one of the surfaces of the cap and one of the surfaces of the filler tube.

2. The fuel-tank filler-tube assembly defined in claim 1 wherein the inner and outer walls have generally coplanar upper edges.

3. The fuel-tank filler-tube assembly defined in claim 1 wherein the cap has an annular outer lip engaging downward around the outer wall.

4. The fuel-tank filler-tube assembly defined in claim 3, wherein the outer lip of the cap and the outer wall are formed with complementary screwthread formations.

5. The fuel-tank filler-tube assembly defined in claim 1 wherein the seal ring is set in the tubular cap extension and radially outwardly engages the inner surface of the outer wall.

6. The fuel-tank filler-tube assembly defined in claim 1 wherein the seal is engaged between the end surfaces of the cap and filler tube.

7. The fuel-tank filler-tube assembly defined in claim 1 wherein the outer wall is formed between the respective inner and end surfaces with an upwardly directed bevel.

8. The fuel-tank filler-tube assembly defined in claim 7 wherein the inner wall is formed at an outer edge of the respective inner surface with an upwardly directed bevel.

9. The fuel-tank filler-tube assembly defined in claim 1 wherein the fill tube is formed with a second outer wall spaced radially outward from the first-mentioned outer wall and forming therewith an upwardly open annular space, the cap being formed with an outer lip fittable downward into the space between the second outer wall and the first outer wall.

10. The fuel-tank filler-tube assembly defined in claim 9 wherein the fill tube is formed at a base of the space between the second and first outer walls with a drain hole.

11. The fuel-tank filler-tube assembly defined in claim 1 wherein the fill tube is formed at a base of the space between the inner and outer walls with a drain hole opening into the passage.

* * * * *